US011060936B2

(12) United States Patent
Sugahara et al.

(10) Patent No.: US 11,060,936 B2
(45) Date of Patent: Jul. 13, 2021

(54) PHYSICAL QUANTITY MEASURING DEVICE

(71) Applicant: NAGANO KEIKI CO., LTD., Tokyo (JP)

(72) Inventors: Yuri Sugahara, Tokyo (JP); Yasuhisa Tanaka, Tokyo (JP); Hidebumi Seki, Tokyo (JP)

(73) Assignee: Nagano Keiki Co., Ltd., Tokyo (JP)

( * ) Notice: Subject to any disclaimer, the term of this patent is extended or adjusted under 35 U.S.C. 154(b) by 29 days.

(21) Appl. No.: 16/574,662

(22) Filed: Sep. 18, 2019

(65) Prior Publication Data

US 2020/0096407 A1     Mar. 26, 2020

(30) Foreign Application Priority Data

Sep. 25, 2018  (JP) .............................. JP2018-179362

(51) Int. Cl.
*G01L 9/00* (2006.01)
*G01L 19/06* (2006.01)

(52) U.S. Cl.
CPC ........ *G01L 19/0627* (2013.01); *G01L 9/0041* (2013.01)

(58) Field of Classification Search
CPC .......................... G01L 9/0041; G01L 19/0627
See application file for complete search history.

(56) References Cited

U.S. PATENT DOCUMENTS 3,926,055 A * 12/1975 Garnett ................. G01L 13/025
                                                    73/720
4,552,153 A * 11/1985 Newman ............ A61B 5/02156
                                                    600/490
4,563,906 A *  1/1986 Mathias ................. G01L 5/171
                                                    73/862.581

(Continued)

FOREIGN PATENT DOCUMENTS

| JP | 63-187309   | 11/1988 |
| JP | 2010-025934 | 2/2010  |
| JP | 5386252     | 1/2014  |

OTHER PUBLICATIONS

Extended European Search Report dated Feb. 27, 2020, Application No. EP 19 19 8895, 9 pages.

(Continued)

*Primary Examiner* — David J Bolduc
(74) *Attorney, Agent, or Firm* — Rankin, Hill & Clark LLP (57) ABSTRACT

A physical quantity measuring device includes a cylindrical case provided with a through hole, a sensor module, a joint, a cap member, a circuit board including an electronic circuit and an electronic adjuster, a sealing member attached to the through hole, and an adjuster member capable of adjusting the electronic adjuster. The electronic adjuster includes an engaged portion disposed to face the through hole. The sealing member is provided with a housing recess opened to an outside of the cylindrical case, and a communication hole for bringing the housing recess into communication with an (Continued)

interior of the cylindrical case. The adjuster member includes a shaft that is hermetically attached in the communication hole, an engagement portion provided at a first end of the shaft to be engageable with the engaged portion, and an operable portion provided at a second end of the shaft and housed in the housing recess.

5 Claims, 6 Drawing Sheets

(56) References Cited

U.S. PATENT DOCUMENTS

| | | | |
|---|---|---|---|
| 2010/0011870 A1 | 1/2010 | Landwehr et al. | |
| 2010/0154552 A1* | 6/2010 | Miyashita | G01L 9/0072 73/718 |
| 2015/0276535 A1* | 10/2015 | Seki | G01L 19/148 73/756 |
| 2015/0276537 A1* | 10/2015 | Toba | G01L 7/08 73/1.59 |
| 2016/0097690 A1* | 4/2016 | Landmann | G01L 9/045 73/706 |
| 2017/0059438 A1* | 3/2017 | Ite | G01K 19/00 |
| 2017/0261607 A1* | 9/2017 | Bridge | G01H 17/00 |
| 2019/0391031 A1* | 12/2019 | Kawase | G01L 19/142 |

OTHER PUBLICATIONS

Japanese Office Action dated May 25, 2021, Application No. 2018-179362; English translation included, 3 pages.

\* cited by examiner

PHYSICAL QUANTITY MEASURING DEVICE

The entire disclosure of Japanese Patent Application No. 2018-179362 filed Sep. 25, 2018 is expressly incorporated by reference herein.

TECHNICAL FIELD

The present invention relates to a physical quantity measuring device.

BACKGROUND ART

A pressure gauge including a built-in adjuster device for adjusting zero point of an electronic evaluation unit has been known (see, for instance, Patent Literature 1: Japanese Patent No. 5386252).

The pressure gauge disclosed in Patent Literature 1 includes a bushing penetrating through a housing, and an adjuster pin provided in the bushing, the adjuster pin engaging with an adjuster device. A tool such as a screwdriver is engageable to the thus arranged adjuster pin from an outside of the housing, thereby allowing a rotation of the adjuster pin with the tool to adjust the adjuster device.

The pressure gauge according to Patent Literature 1 includes a sticker adhered on the housing, the sticker covering the adjuster pin to prevent unintended operation on the adjuster pin.

However, the adjuster pin of Patent Literature 1, which is covered with the sticker as described above, is not operable unless the sticker is removed, imposing extra load on a user in adjusting the adjuster device.

SUMMARY OF THE INVENTION

An object of the invention is to provide a physical quantity measuring device capable of easily adjusting an electronic circuit.

A physical quantity measuring device according to an aspect of the invention includes: a cylindrical case including a circumferential portion with a through hole formed therein; a sensor module housed in the cylindrical case and configured to detect a physical quantity; a joint attached with the sensor module, the joint being disposed to cover a first opening of the cylindrical case; a cap member disposed to cover a second opening of the cylindrical case; a circuit board including an electronic circuit configured to receive a signal detected by the sensor module and an electronic adjuster configured to adjust the electronic circuit, the circuit board being housed in the cylindrical case; a sealing member attached to the through hole; and an adjuster member configured to adjust the electronic adjuster, where the electronic adjuster includes an engaged portion disposed to face the through hole, the sealing member is provided with a housing recess opened to an outside of the cylindrical case and a communication hole that brings the housing recess into communication with an interior of the cylindrical case, and the adjuster member includes a shaft hermetically attached in the communication hole, an engagement portion provided at a first end of the shaft and configured to engage with the engaged portion, and an operable portion provided at a second end of the shaft and housed in the housing recess.

In the above aspect of the invention, the adjuster member configured to adjust the electronic adjuster includes the shaft, the engagement portion provided at the first end of the shaft and engageable with the engaged portion of the electronic adjuster, and the operable portion provided at the second end of the shaft. Thus, the engaged portion of the electronic adjuster is adjustable through the shaft and the engagement portion by operating the operable portion of the adjuster member. At this time, the operable portion, which is housed in the housing recess opened to an outside of the cylindrical case, can be operated from the outside of the cylindrical case. Accordingly, it is not necessary to expose an interior of the cylindrical case or remove a sticker covering the adjuster member in order to adjust the electronic adjuster, facilitating the operation for the adjustment.

Further, the joint and the cap member are provided to cover the openings of the cylindrical case, and the sealing member is provided to the through hole formed in the circumferential portion of the cylindrical case. The shaft of the adjuster member is hermetically attached to the communication hole provided in the sealing member. Accordingly, moisture, dust and the like can be kept from entering the interior of the cylindrical case through the openings, the through hole, and the communication hole.

In the physical quantity measuring device according to the above aspect of the invention, it is preferable that the physical quantity measuring device further includes a cover member attached to the electronic adjuster to cover the electronic adjuster, where the cover member includes a cover body covering the electronic adjuster, and a guide configured to guide the engagement portion to a position corresponding to the engaged portion, a first groove is formed on the shaft along an outer circumference of the shaft, and the guide is provided with a first projection engageable with the first groove.

According to the above arrangement, the cover member, whose position is determined by the electronic adjuster, includes the guide for guiding the engagement portion of the adjuster member to the position corresponding to the engaged portion of the electronic adjuster. The guide is provided with the first projection engaged with the first groove provided along the outer circumference of the shaft. The position of the shaft with respect to the guide is thus determined. Accordingly, the engagement portion provided at the first end of the shaft is prevented from being misaligned with the engaged portion of the electronic adjuster.

In the physical quantity measuring device according to the above aspect of the invention, it is preferable that the shaft is provided with a projection projecting along the outer circumference and engagable with the first projection, and the cover member is an elastic component that is configured to bias the projection of the adjuster member with the first projection in a direction for separating the engagement portion from the engaged portion in an axial direction of the shaft.

According to the above arrangement, the first projection of the cover member, which is an elastic component, biases the projection of the adjuster member in a direction for the engagement portion to be separated from the engaged portion in the axial direction of the shaft. Thus, the adjuster member is separated from the electronic adjuster when the adjuster member is not operated, so that the electronic adjuster is kept from being unintentionally operated even when the adjuster member is moved upon vibrations and the like. Accordingly, unintended adjustment on the electronic adjuster due to vibrations and the like can be prevented. Further, the cover member in a form of an elastic component can be elastically deformed by pushing the adjuster member through the operable portion in operating the adjuster member. Accordingly, the engagement portion can be easily engaged with the engaged portion, allowing easy adjustment of the electronic adjuster.

In physical quantity measuring device according to the above aspect of the invention, it is preferable that a second groove is formed on the shaft along the outer circumference of the shaft, and the sealing member includes a second projection projecting into the communication hole to be engaged with the second groove.

According to the above arrangement, the shaft is provided with the second groove along the outer circumference thereof and the sealing member is provided with the second projection projecting into the communication hole to be engaged with the second groove. The position of the shaft with respect to the sealing member is thus determined. Accordingly, the engagement portion provided at the first end of the shaft is prevented from being misaligned with the engaged portion of the electronic adjuster.

In the physical quantity measuring device according to the above aspect of the invention, it is preferable that the sealing member is an elastic component that biases the adjuster member with the second projection in a direction for separating the engagement portion from the engaged portion in an axial direction of the shaft.

According to the above arrangement, the second projection of the sealing component, which is an elastic component, biases the adjuster member in a direction for the engagement portion to be separated from the engaged portion in the axial direction of the shaft. Thus, the adjuster member is separated from the electronic adjuster when the adjuster member is not operated, so that the electronic adjuster is kept from being unintentionally operated even when the adjuster member is moved upon vibrations and the like. Accordingly, unintended adjustment on the electronic adjuster due to vibrations and the like can be prevented. Further, the sealing member in a form of an elastic component can be elastically deformed by pushing the adjuster member through the operable portion in operating the adjuster member. Accordingly, the engagement portion can be easily engaged with the engaged portion, allowing easy adjustment of the electronic adjuster.

DESCRIPTION OF EMBODIMENT(S)

First Exemplary Embodiment

A first exemplary embodiment of the invention will be described with reference to the attached drawings.

Figure 1:
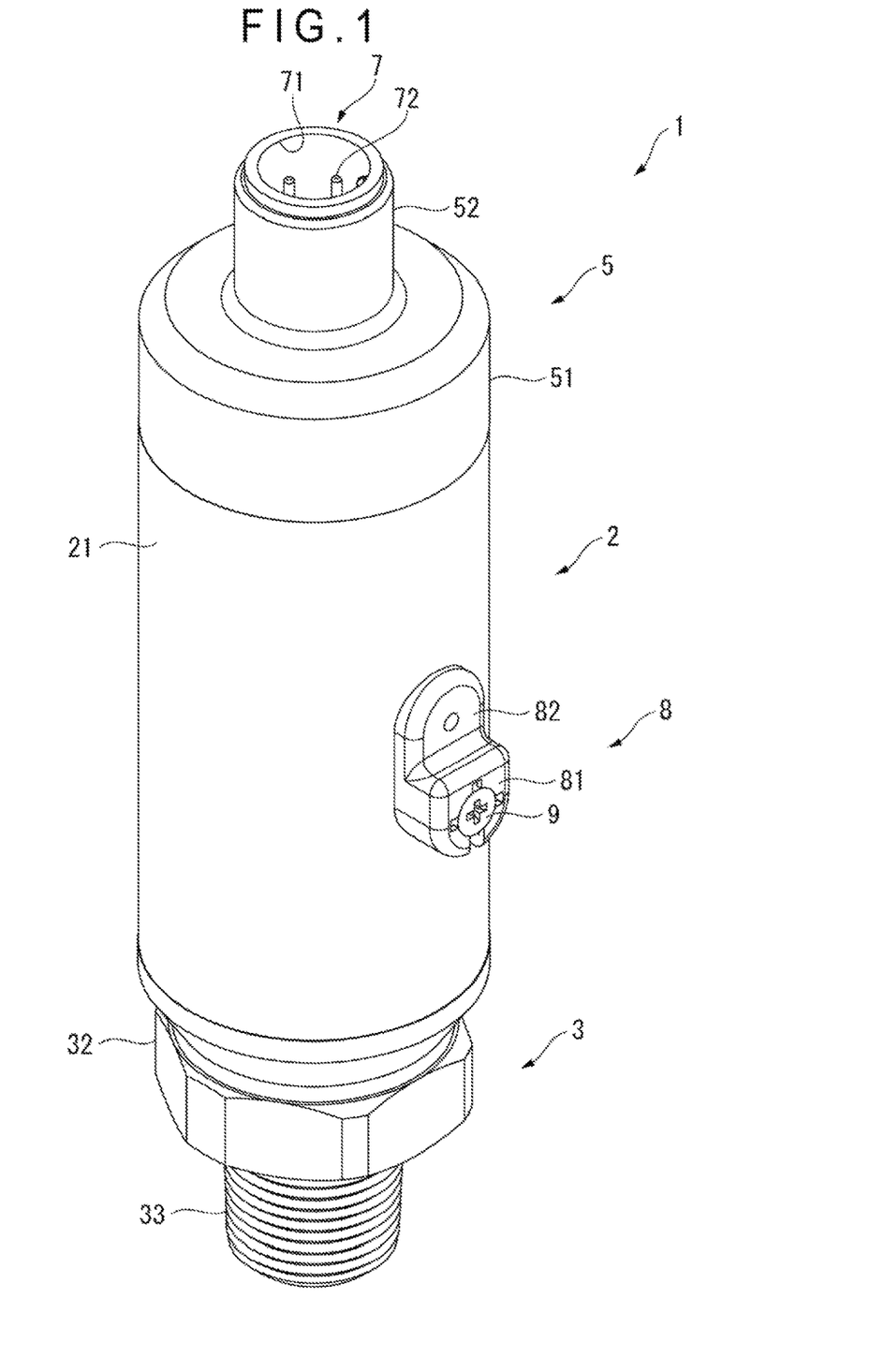
FIG. 1 is a perspective view showing an overall structure of a physical quantity measuring device according to a first exemplary embodiment of the invention.
Figure 2:
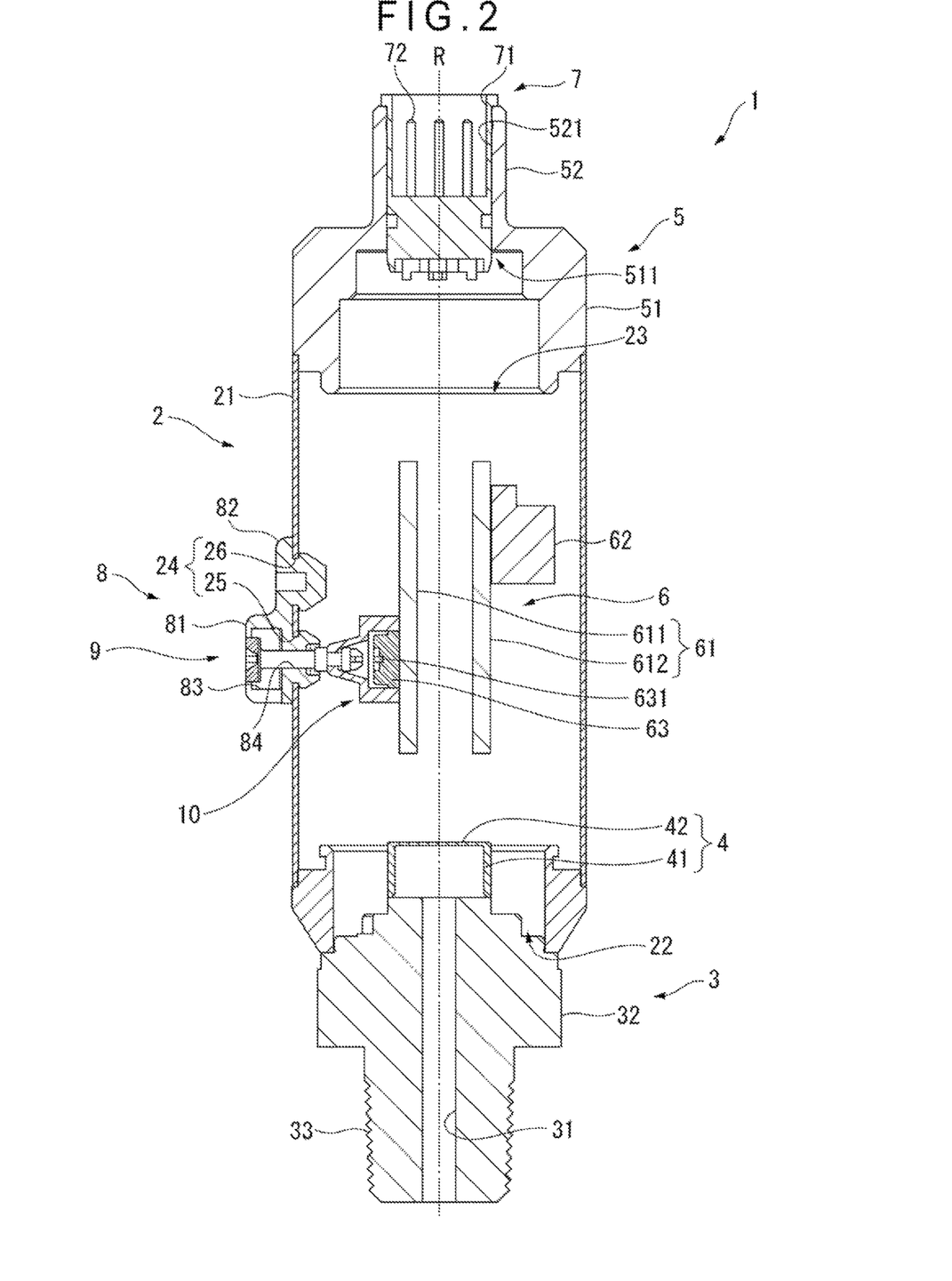
FIG. 2 is a cross-sectional view showing the overall structure of the physical quantity measuring device according to the first exemplary embodiment.
Figure 3:
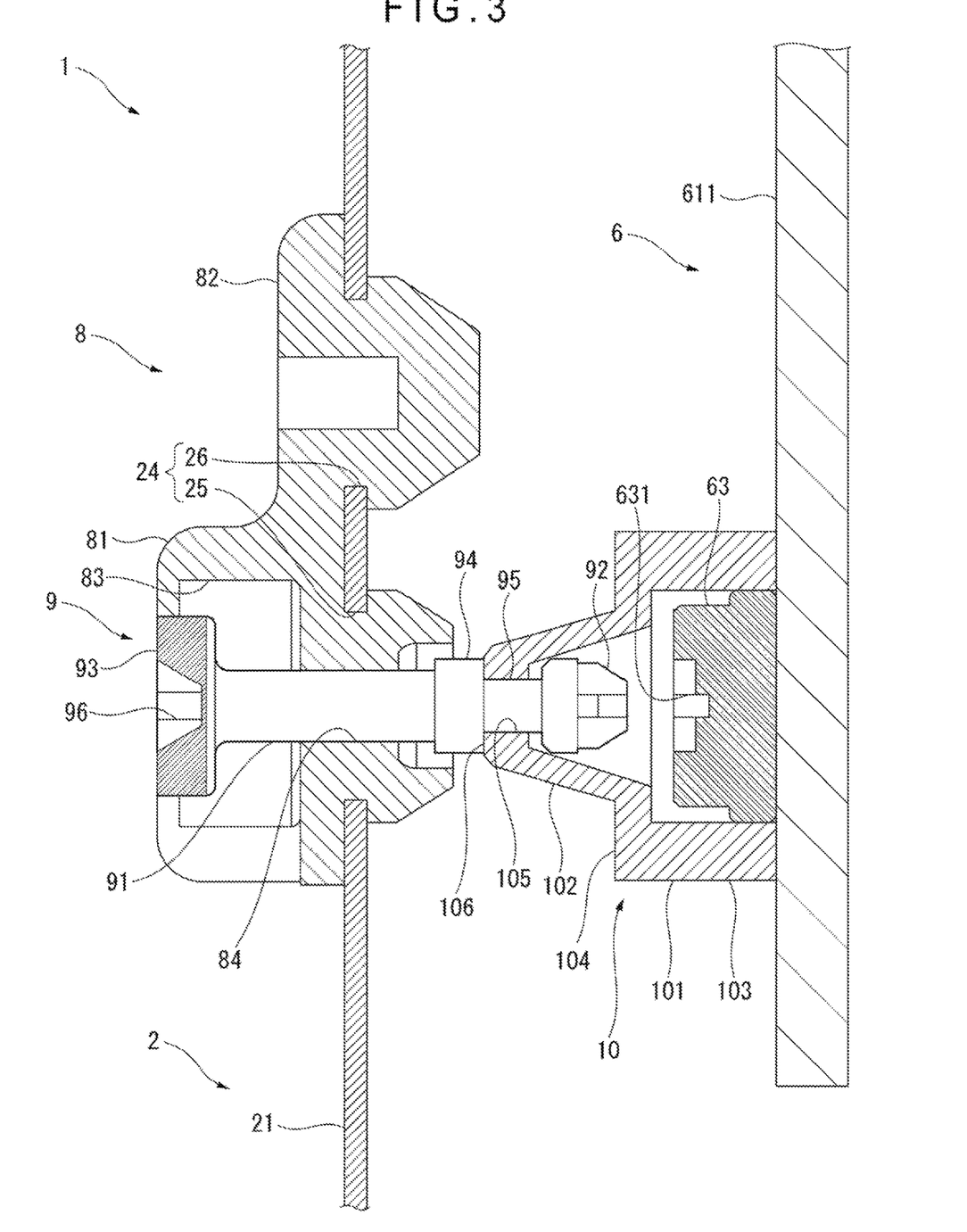
FIG. 3 is an enlarged cross-sectional view showing a relevant part of the physical quantity measuring device according to the first exemplary embodiment.

FIG. 1 is a perspective view showing an overall structure of a physical quantity measuring device 1 according to the first exemplary embodiment. FIG. 2 is a cross-sectional view showing the overall structure of the physical quantity measuring device 1. FIG. 3 is an enlarged cross-sectional view showing a relevant part of the physical quantity measuring device 1.

As shown in FIGS. 1 to 3, the physical quantity measuring device 1 includes a cylindrical case 2, a joint 3, a sensor module 4, a cap member 5, a circuit board 6, a signal transmitting member 7, a sealing member 8, an adjuster member 9, and a cover member 10.

Cylindrical Case

The cylindrical case 2, which is a metallic component in a form of a hollow cylinder, includes a circumferential portion 21, and a first opening 22 and a second opening 23 that are defined on a first end and a second end of the cylindrical case 2, respectively, along a center axis R of the cylindrical case 2.

Holes 24 are defined in the circumferential portion 21. The holes 24 include a through hole 25 and an attachment hole 26 provided on a lower side and an upper side in FIG. 3, respectively. The through hole 25 is provided at a position facing an engaged portion 631 of an electronic adjuster 63 described later.

Joint

The joint 3 is a metallic component that is disposed to cover the first opening 22 of the cylindrical case 2. In the first exemplary embodiment, the joint 3 is welded to an end of the cylindrical case 2 provided with the first opening 22. It should be noted that the joint 3 is not necessarily welded with the cylindrical case 2. For instance, the joint 3 may alternatively be threaded with the cylindrical case 2.

The joint 3 includes an introduction port 31 into which a measurement target fluid is introduced. A first end of the joint 3 is defined as a tool engagement portion 32 radially extending from the center of the joint 3 and being engageable with a tool (e.g., a spanner). A second end of the joint 3 is defined as an external thread 33 to be screwed into an attachment target (not shown). It should be noted that the second end of the joint 3 is not necessarily in the form of the external thread 33 but, for instance, may be in a form of an internal thread. Alternatively, the second end of the joint 3 may be welded to the attachment target.

Sensor Module

The sensor module 4 includes a cylindrical portion 41 attached to the first end of the joint 3, and a diaphragm 42 integrated with a first end of the cylindrical portion 41.

A strain gauge (not shown) is formed in the diaphragm 42, the strain gauge being configured to detect a pressure of the measurement target fluid being introduced through the above-described introduction port 31.

The sensor module 4 is not limited to one having the diaphragm 42, but may be, for instance, a so-called MEMS (Micro Electro Mechanical System) sensor. Any sensor capable of detecting the pressure of the measurement target fluid is usable.

Cap Member

The cap member 5, which is a metallic component of a so-called connector type, includes a cap body 51 and a cylindrical portion 52. The cap body 51, which is in a form of a bottomed cylinder, is welded at an open end thereof to the second opening 23 of the cylindrical case 2. It should be noted that the cap body 51 is not necessarily welded to the cylindrical case 2 but may, for instance, be threaded into the cylindrical case 2.

A communicating portion 511 in communication with the cylindrical portion 52 is provided to the bottom of the cap body 51. An inner circumferential surface of the cylindrical portion 52 defines an attachment hole 521 in which the signal transmitting member 7 is housed.

The cap member 5 is not necessarily arranged as described above, but may be, for instance, a terminal box type component in which a terminal block is provided, or a component capable of wireless output.

Circuit Board

The circuit board 6 includes a board body 61, and an electronic circuit 62 and an electronic adjuster 63 that are provided to the board body 61.

The board body 61, which is a rectangular plate in a plan view whose direction along the center axis R of the cylindrical case 2 is defined as a longitudinal direction, has a wiring pattern (not shown) on a front surface.

In the first exemplary embodiment, the board body 61 includes a first board 611 and a second board 612 being disposed in parallel to each other. The first board 611 and the second board 612 are held by a holder (not shown). The board body 61 is not necessarily arranged as described above. For instance, the board body 61 may be provided by a single board or three or more boards.

The electronic circuit 62, which is configured to receive a detection signal from the sensor module 4, is provided on the second board 612. The strain gauge of the sensor module 4 is electrically connected to the electronic circuit 62 with a wire and the like (not shown).

The electronic adjuster 63, which is configured to adjust the electronic circuit 62, is provided to the first board 611 in a manner to face the circumferential surface of the cylindrical case 2. In the first exemplary embodiment, the electronic adjuster 63 is configured to adjust a zero point of the electronic circuit 62. However, the electronic adjuster 63 is not necessarily configured to adjust the zero point of the electronic circuit 62, but may be used for, for instance, adjustment of an output voltage of the electronic circuit 62 (span adjustment), correction of linearity, or a dampener.

The electronic adjuster 63 includes an engaged portion 631 at a position corresponding to the above-described through hole 25, the engaged portion 631 serving as a trimmer. The engaged portion 631 is provided with a cross dent, which is engageable with an engagement portion 92 of the adjuster member 9 described later. Thus, the electronic adjuster 63 is operable by the adjuster member 9. Details of the operation on the electronic adjuster 63 by the adjuster member 9 will be described later.

Signal Transmitting Member

The signal transmitting member 7 includes a cylindrical member 71 and a plurality of terminals 72 provided to the cylindrical member 71 The terminals 72 are electrically connected to the circuit board 6 through a wire and the like (not shown).

Sealing Member

The sealing member 8 is detachably attached to the through hole 25 and the attachment hole 26 of the cylindrical case 2 to seal the through hole 25 and the attachment hole 26. It should be noted that the sealing member 8 is not necessarily detachably attached to the through hole 25 and the attachment hole 26 but, for instance, may be fixedly attached to the through hole 25 and the attachment hole 26.

The sealing member 8, which is a rubber elastic component, includes a first sealing portion 81 attached to the through hole 25 and a second sealing portion 82 integrated with the first sealing portion 81 and attached to the attachment hole 26.

The first sealing portion 81 includes a housing recess 83 opened to an outside of the cylindrical case 2, and a communication hole 84 that brings the housing recess 83 in communication with an interior of the cylindrical case 2.

Adjuster Member

The adjuster member 9, which is a pin-shaped synthetic-resin component, is configured to operate the above-described engaged portion 631 of the electronic adjuster 63. It should be noted that the adjuster member 9 is not necessarily a synthetic-resin component but, for instance, may be a metallic component. The adjuster member 9 includes a shaft 91, an engagement portion 92 provided to a first end of the shaft 91, and an operable portion 93 provided to a second end of the shaft 91.

The shaft 91 is a stick component attached into the above-described communication hole 84 of the sealing member 8 to hermetically close the communication hole 84. In other words, the shaft 91 seals the communication hole 84. Thus, moisture, dust and the like can be kept from entering the interior of the cylindrical case 2 through the communication hole 84. The adjuster member 9 is movable in the axial direction of the shaft 91 in the communication hole 84. Even during the movement of the adjuster member 9 in the axial direction of the shaft 91, the communication hole 84 is kept hermetically closed by the shaft 91.

Further, the shaft 91 includes a projection 94 radially projecting along the outer circumference thereof, and a first groove 95 provided at or near an end of the projection 94, the first groove 95 radially dented along the outer circumference of the shaft 91.

The engagement portion 92, which is a cross-shaped projection projecting from a distal end of the shaft 91, is engageable with the above-described engaged portion 631 of the electronic adjuster 63. The engagement portion 92 is not necessarily the cross-shaped projection projecting from the distal end of the shaft 91, but may be, for instance, a hexagonal projection. In other words, the engagement portion 92 may be configured in any manner as long as being engageable with the engaged portion 631.

The operable portion 93 is housed in the above-described housing recess 83 of the sealing member 8. The operable portion 93 is provided with an operable slot 96 in a form of a cross slot. Thus arranged operable portion 93 is engageable with a tool such as a screwdriver. The shaft 91 and the engagement portion 92 are rotatable through the operable portion 93 by rotating a tool while the tool is engaged with the operable slot 96. The operable slot 96, which is not necessarily the cross slot but may be, for instance, a hexagonal slot, is designed in any manner as long as being engageable with the tool such as a screwdriver.

Cover Member

The cover member 10 is a rubber elastic component disposed to cover the electronic adjuster 63. The cover member 10 includes a cover body 101, and a guide 102. The cover member 10 is not necessarily made of rubber but may be made of any elastic component.

The cover body 101 is disposed along an outer circumferential edge of the electronic adjuster 63. In other words, the position of the cover body 101 is determined by the electronic adjuster 63. The cover body 101 includes a sidewall 103 surrounding the electronic adjuster 63, and a base 104 extending from the sidewall 103.

The guide 102, which is configured to guide the engagement portion 92 of the adjuster member 9 to a position corresponding to the engaged portion 631 of the electronic adjuster 63, is in a form of a cylinder tapered from the base 104 of the cover body 101 toward a distal end of the guide 102. A base end of the guide 102 is in communication with an interior of the cover body 101. An insertion hole 105 for receiving the shaft 91 of the adjuster member 9 and a first projection 106 projecting into the insertion hole 105 are provided at the distal end of the guide 102. The first projection 106 engages with the above-described projection 94 and first groove 95 of the shaft 91. Thus, the mutual position between the adjuster member 9 and the cover member 10 is determined in a direction intersecting the axial direction of the adjuster member 9.

Adjustment Method of Electronic Adjuster

Next, the adjustment method of the electronic adjuster 63 will be described below.

Initially, in the state shown in FIG. 3, a tool such as a screwdriver is engaged with the operable slot 96 of the adjuster member 9 to push the adjuster member 9 in the axial direction of the shaft 91.

Figure 4:
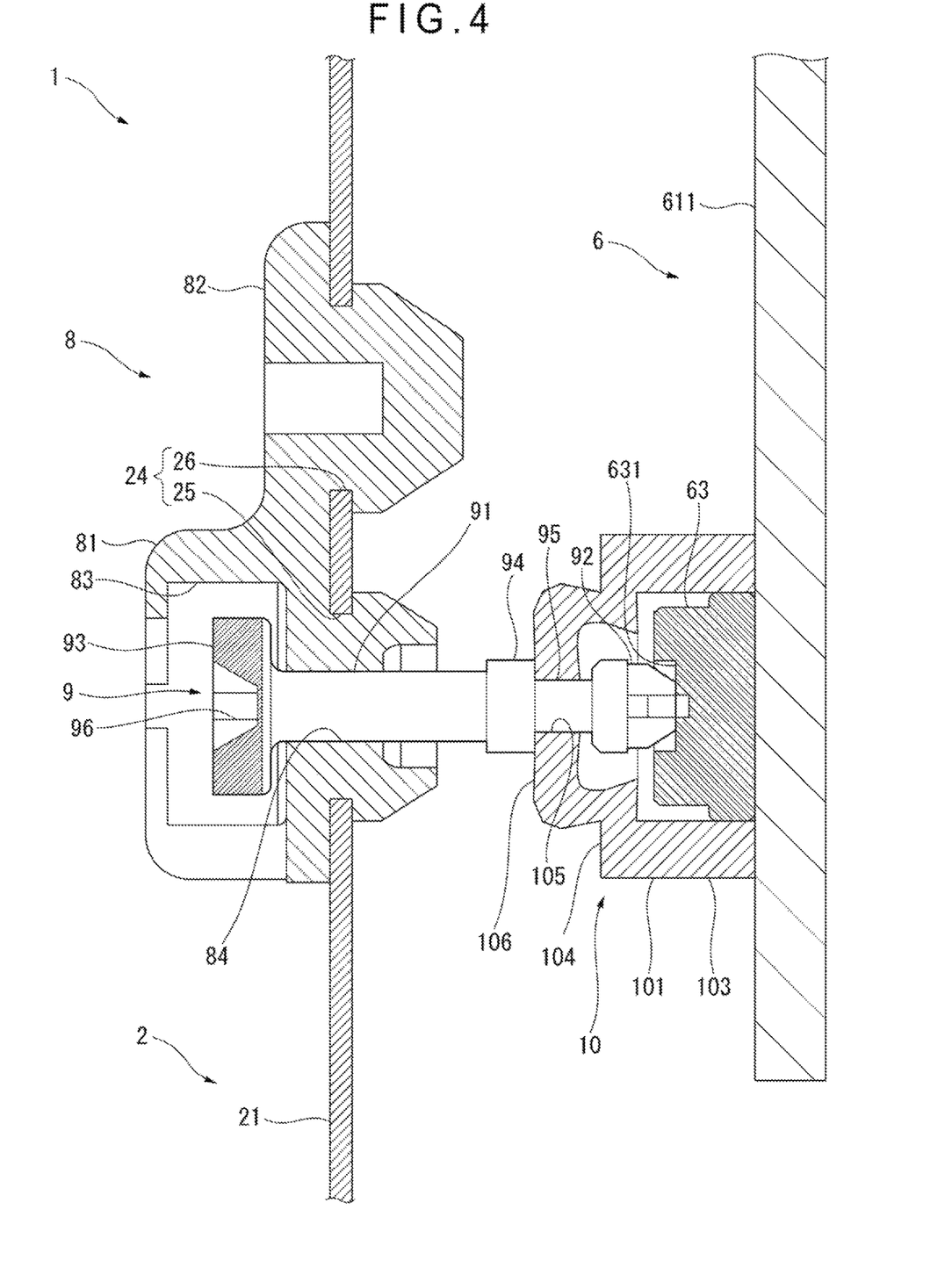
FIG. 4 is an enlarged cross-sectional view showing an operation on the relevant part of the physical quantity measuring device according to the first exemplary embodiment.

FIG. 4 is an enlarged cross-sectional view showing the adjuster member 9 being pushed.

As shown in FIG. 4, the adjuster member 9 is pushed by the tool such as a screwdriver, so that the engagement portion 92 is moved to a position engageable with the engaged portion 631 of the electronic adjuster 63. At this time, in the first exemplary embodiment, the cover member 10 is pushed by the adjuster member 9 to be elastically deformed.

Next, the tool is rotated while the adjuster member 9 is pushed, causing rotation of the shaft 91 and the engagement portion 92 through the operable portion 93. Then, the engagement portion 92 is engaged with the engaged portion 631 of the electronic adjuster 63 to rotate the engaged portion 631. Thus, the electronic adjuster 63 is adjusted.

After the adjustment of the electronic adjuster 63 is completed, the tool is separated from the operable portion 93 of the adjuster member 9, releasing the force for pushing the adjuster member 9 in the axial direction of the shaft 91. Then, the elastically deformed cover member 10 is inclined to return to the initial state. At this time, the first projection 106 of the guide 102, which is engaged with the projection 94 of the adjuster member 9, biases the projection 94 of the adjuster member 9 in a direction for separating the engagement portion 92 from the engaged portion 631 in the axial direction of the shaft 91. Thus, the adjuster member 9 moves in a direction for separating the engagement portion 92 from the engaged portion 631 in the axial direction of the shaft 91, returning to the state shown in FIG. 3. In other words, the engagement portion 92 is separated from the engaged portion 631 when the adjuster member 9 is not pushed.

The following advantages can be obtained in the first exemplary embodiment.

(1) In the first exemplary embodiment, the adjuster member 9 configured to adjust the electronic adjuster 63 includes the shaft 91, the engagement portion 92 provided at the first end of the shaft 91 and engageable with the engaged portion 631 of the electronic adjuster 63, and the operable portion 93 provided at the second end of the shaft 91. Thus, the engaged portion 631 of the electronic adjuster 63 is adjustable through the shaft 91 and the engagement portion 92 by operating the operable portion 93 of the adjuster member 9. At this time, the operable portion 93, which is housed in the housing recess 83 opened to an outside of the cylindrical case 2, can be operated from the outside of the cylindrical case 2. Accordingly, it is not necessary to expose an interior of the cylindrical case 2 or remove a sticker covering the adjuster member 9 in order to adjust the electronic adjuster 63, facilitating the operation for the adjustment.

Further, the joint 3 and the cap member 5 are provided to cover the first opening 22 and the second opening 23 of the cylindrical case 2, respectively, and the sealing member 8 is provided to the through hole 25 and the attachment hole 26 provided to the circumferential portion 21 of the cylindrical case 2. The shaft 91 of the adjuster member 9 is hermetically attached to the communication hole 84 provided in the sealing member 8. Accordingly, moisture, dust and the like can be kept from entering the interior of the cylindrical case 2 through the openings 22, 23, the through hole 25, the attachment hole 26, and the communication hole 84.

(2) In the first exemplary embodiment, the cover member 10, whose position is determined by the electronic adjuster 63, includes the guide 102 for guiding the engagement portion 92 of the adjuster member 9 to the position corresponding to the engaged portion 631 of the electronic adjuster 63. The guide 102 is provided with the first projection 106 engaged with the first groove 95 provided along the outer circumference of the shaft 91. The position of the shaft 91 with respect to the guide 102 is thus determined. Accordingly, the engagement portion 92 provided at the distal end of the shaft 91 is prevented from being misaligned with the engaged portion 631 of the electronic adjuster 63.

(3) In the first exemplary embodiment, the first projection 106 of the cover member 10 that is an elastic component biases the projection 94 of the adjuster member 9 in a direction for the engagement portion 92 to be separated from the engaged portion 631 in the axial direction of the shaft 91. Thus, the adjuster member 9 is separated from the electronic adjuster 63 when the adjuster member 9 is not operated, so that the electronic adjuster 63 is kept from being unintentionally operated even when the adjuster member 9 is moved upon being applied with vibrations and the like. Accordingly, unintended adjustment on the electronic adjuster 63 due to vibrations and the like can be prevented. Further, the cover member 10 in a form of an elastic component can be elastically deformed by pushing the adjuster member 9 through the operable portion 93 in operating the adjuster member 9. Accordingly, the engagement portion 92 can be easily engaged with the engaged portion 631, allowing easy adjustment of the electronic adjuster 63.

Second Exemplary Embodiment

Next, a second exemplary embodiment of the invention will be described with reference to the attached drawings.

A physical quantity measuring device 1A according to the second exemplary embodiment is different from the physical quantity measuring device 1 in the first exemplary embodiment in that a sealing member 8A is elastically deformed when the adjuster member 9A is pushed by a tool or the like. It should be noted that the same or substantially the same components in the second exemplary embodiment as those in the first exemplary embodiment will be given the same reference numerals as in the first exemplary embodiment to omit the description thereof.

Sealing Member

Figure 5:
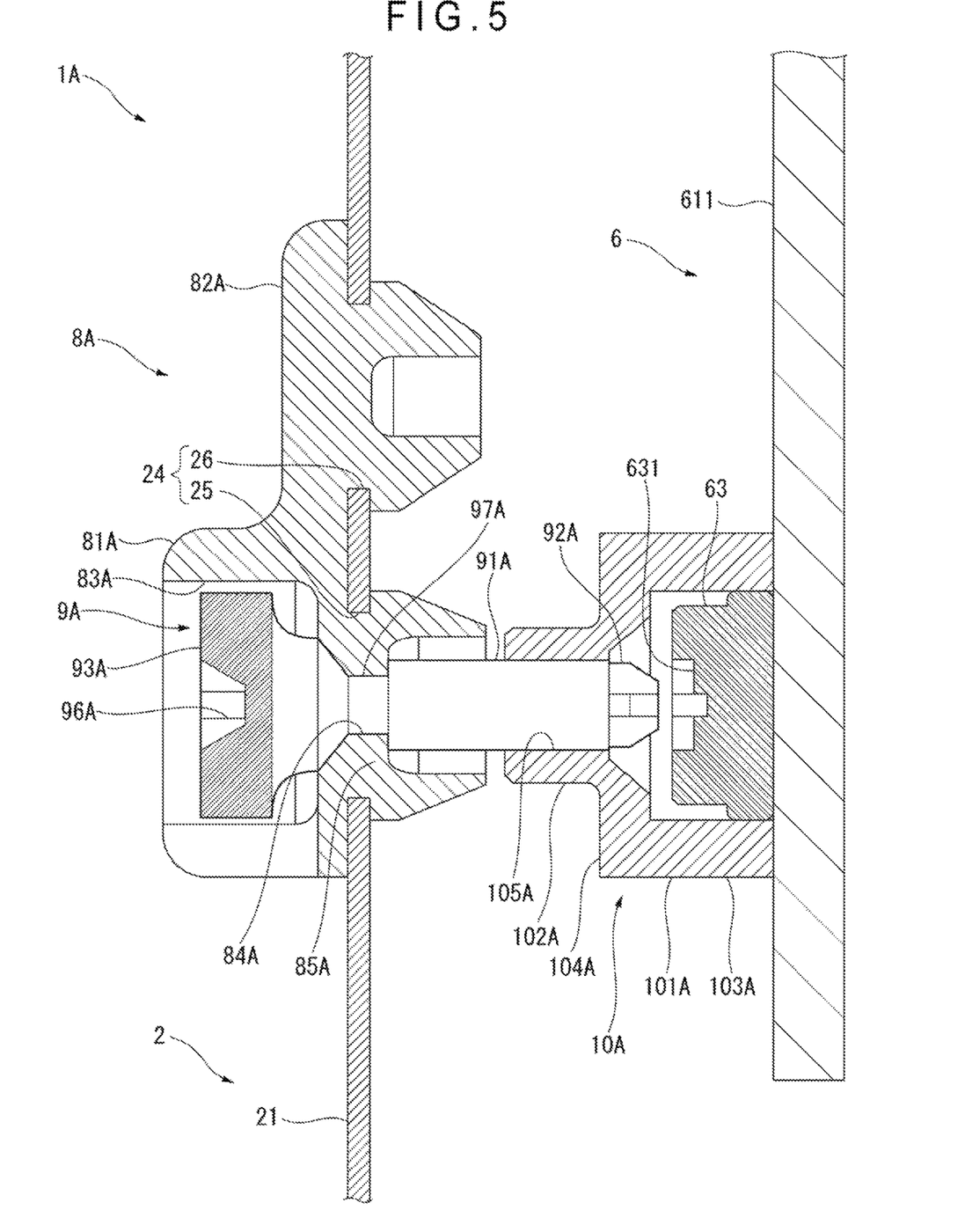
FIG. 5 is an enlarged cross-sectional view showing a relevant part of a physical quantity measuring device according to a second exemplary embodiment of the invention.

FIG. 5 is an enlarged cross-sectional view showing a relevant part of the physical quantity measuring device 1A according to the second exemplary embodiment.

The sealing member 8A, which is a rubber elastic component, includes a first sealing portion 81A attached to the through hole 25 and a second sealing portion 82A integrated with the first sealing portion 81A and attached to the attachment hole 26. The sealing member 8A is not necessarily made of rubber but may be made of any elastic component.

The first sealing portion 81A includes a housing recess 83A opened to the outside of the cylindrical case 2, and a communication hole 84A that brings the housing recess 83 in communication with the interior of the cylindrical case 2.

Further, in the second exemplary embodiment, the first sealing portion 81A is provided with a second projection 85A projecting into the communication hole 84A. The second projection 85A is engaged with a second groove 97A of the adjuster member 9A described later.

Adjuster Member

The adjuster member 9A includes a shaft 91A, an engagement portion 92A provided to a first end of the shaft 91A, and an operable portion 93A provided to a second end of the shaft 91A. As in the above-described first exemplary embodiment, the shaft 91A is attached into the communication hole 84A of the sealing member 8A to hermetically close the communication hole 84A.

Further, in the second exemplary embodiment, the shaft 91A is provided with a second groove 97A dented along an outer circumference of the shaft 91A, the second groove 97A being engaged with the above-described second projection 85A of the sealing member 8A.

As in the above-described first exemplary embodiment, the engagement portion 92A is in a form of a cross-shaped projection from a distal end of the shaft 91A.

As in the above-described first exemplary embodiment, the operable portion 93A is housed in the housing recess 83A of the sealing member 8A and is provided with an operable slot 96A in a form of a cross slot.

Cover Member

As in the above-described first exemplary embodiment, the cover member 10A is disposed to cover the electronic adjuster 63. The cover member 10A includes a cover body 101A, and a guide 102A.

As in the above-described first exemplary embodiment, the cover body 101A includes a sidewall 103A disposed along an outer circumferential edge of the electronic adjuster 63 to surround the electronic adjuster 63, and a base 104A extending from the sidewall 103A.

The guide 102A is a cylindrical part extending from the base 104A of the cover body 101A. A base end of the guide 102A is in communication with an interior of the cover body 101A. An insertion hole 105A for receiving the shaft 91A of the adjuster member 9A is provided at a distal end of the guide 102A.

Adjustment Method of Electronic Adjuster

Next, the adjustment method of the electronic adjuster 63 will be described below.

Initially, in the state shown in FIG. 5, as in the above-described first exemplary embodiment, a tool such as a screwdriver is engaged with the operable slot 96A of the adjuster member 9A to push the adjuster member 9A in the axial direction of the shaft 91A.

Figure 6:
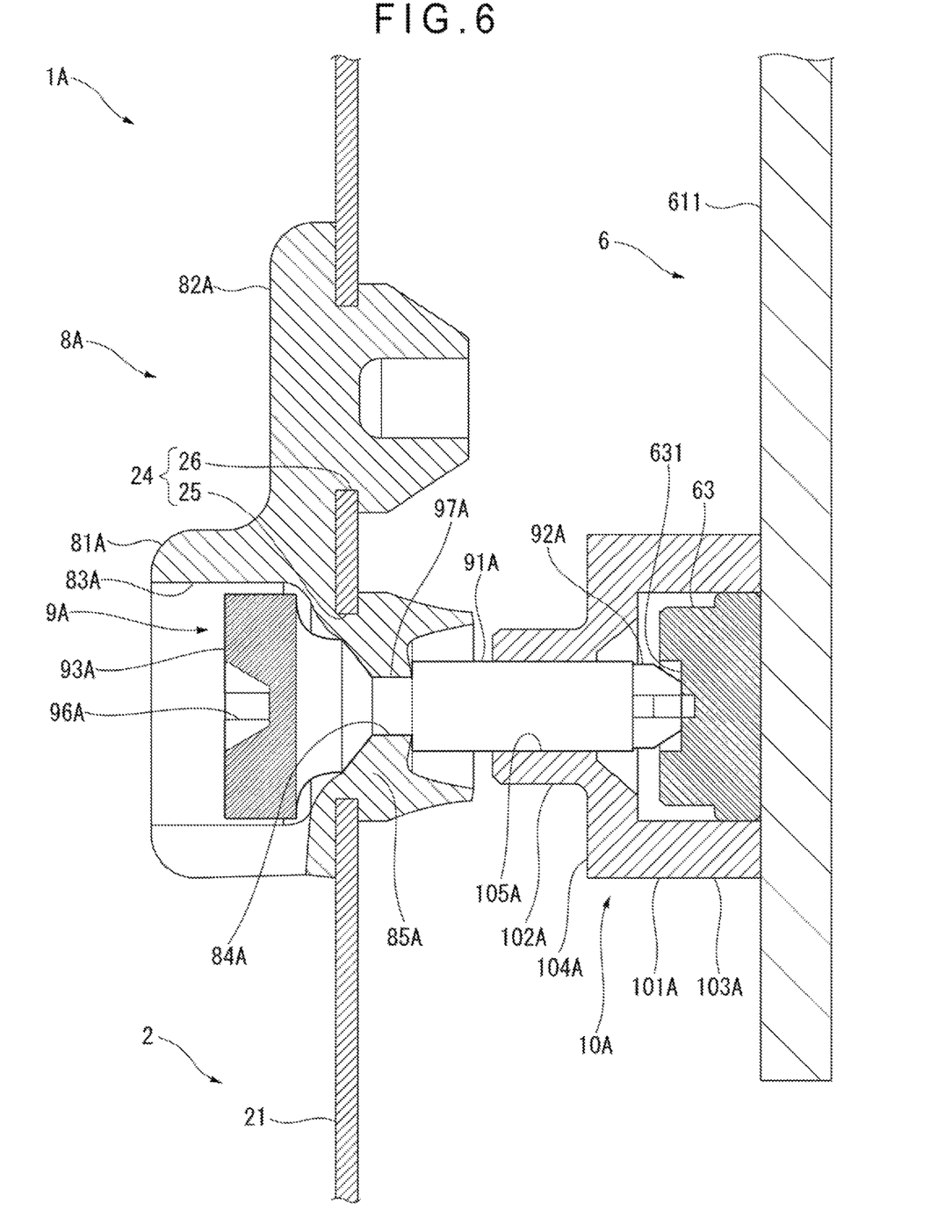
FIG. 6 is an enlarged cross-sectional view showing an operation on the relevant part of the physical quantity measuring device according to the second exemplary embodiment.

FIG. 6 is an enlarged cross-sectional view showing the adjuster member 9A being pushed.

As shown in FIG. 6, the adjuster member 9A is pushed by the tool such as a screwdriver, so that the engagement portion 92A is moved to a position engageable with the engaged portion 631 of the electronic adjuster 63. At this time, in the second exemplary embodiment, the sealing member 8A is pushed by the adjuster member 9A to be elastically deformed.

Next, when the tool is rotated while the adjuster member 9A is pushed, the electronic adjuster 63 is adjusted as in the above-described first exemplary embodiment.

After the adjustment of the electronic adjuster 63 is completed, the tool is separated from the operable portion 93A of the adjuster member 9A, releasing the force for pushing the adjuster member 9A in the axial direction of the shaft 91A. Then, the elastically deformed sealing member 8A is inclined to return to the initial state. At this time, the second projection 85A of the sealing member 8A, which is engaged with the second groove 97A of the adjuster member 9A, biases the adjuster member 9A in a direction for separating the engagement portion 92A from the engaged portion 631 in the axial direction of the shaft 91A. Thus, the adjuster member 9A moves in a direction for separating the engagement portion 92A from the engaged portion 631 in the axial direction of the shaft 91A, returning to the state shown in FIG. 5. In other words, the engagement portion 92A is separated from the engaged portion 631 when the adjuster member 9A is not pushed.

The above-described second exemplary embodiment can provide the following advantages in addition to the advantage (1) in the first exemplary embodiment.

(4) In the second exemplary embodiment, the shaft 91A is provided with the second groove 97A along the outer circumference thereof and the sealing member 8A is provided with the second projection 85A projecting into the communication hole 84A to be engaged with the second groove 97A. The position of the shaft 91A with respect to the sealing member 8A is thus determined. Accordingly, the engagement portion 92A provided at the distal end of the shaft 91A is prevented from being misaligned with the engaged portion 631 of the electronic adjuster 63.

(5) In the second exemplary embodiment, the sealing member 8A, which is an elastic component, biases the adjuster member 9A by the second projection 85A in a direction for the engagement portion 92A to be separated from the engaged portion 631 in the axial direction of the shaft 91A. Thus, the adjuster member 9A is separated from the electronic adjuster 63 when the adjuster member 9A is not operated, so that the electronic adjuster 63 is kept from being unintentionally operated even when the adjuster member 9A is moved upon being applied with vibrations and the like. Accordingly, unintended adjustment on the electronic adjuster 63 due to vibrations and the like can be prevented. Further, the sealing member 8A in a form of an elastic component can be elastically deformed by pushing the adjuster member 9A through the operable portion 93A in operating the adjuster member 9A. Accordingly, the engagement portion 92A can be engaged with the engaged portion 631, allowing easy adjustment of the electronic adjuster 63.

Modification(s)

It should be understood that the scope of the invention is not limited to the above-described exemplary embodiments but includes modifications and improvements as long as the modifications and improvements are compatible with an object of the invention.

Though a single attachment hole 26 is provided in the circumferential portion 21 of the cylindrical case 2 in the exemplary embodiments, such an arrangement is not limiting. For instance, no attachment hole is provided, or three or more attachment holes are provided in some embodiments.

Though the cylindrical case 2 is in a form of a hollow cylinder in the above exemplary embodiments, such an arrangement is not limiting. For instance, the cylindrical case is in a form of a hollow quadratic cylinder or a hollow hexagonal cylinder in some embodiments.

Though the first sealing portions 81, 81A and the second sealing portions 82, 82A are integrated in the exemplary embodiments, such an arrangement is not limiting. For instance, the first sealing portion and the second sealing portion are separately provided in some embodiments.

Though the cover members 10, 10A are provided to cover the electronic adjuster 63 in the exemplary embodiments, such an arrangement is not limiting. For instance, the cover member is provided in some embodiments so that a part of the electronic adjuster is exposed. Furthermore, the invention encompasses a physical quantity measuring device without including the cover member.

Though one of the sealing member 8A and the cover member 10 is elastically deformed when the adjuster members 9, 9A are pushed in the exemplary embodiments, such an arrangement is not limiting. For instance, both of the sealing member and the cover member are elastically deformed in some embodiments. Further, for instance, a spring member configured to bias the adjuster member in a direction for separating the engagement portion from the engaged portion is provided in some embodiments.

Though the engagement portion 92 (92A) of the adjuster member 9 (9A) is separated from the engaged portion 631 of the electronic adjuster 63 when the adjuster member 9 (9A) is not operated in the exemplary embodiments, such an arrangement is not limiting. In some embodiments of the invention, the engagement portion of the adjuster member and the engaged portion of the electronic adjuster are engaged while the adjuster member is not operated.

Though the electronic adjuster 63 is provided with a single engaged portion 631 in the exemplary embodiments, such an arrangement is not limiting. For instance, two or more engaged portions for zero-point adjustment, span adjustment and the like are provided to the electronic adjuster in some embodiments. In this case, two or more adjuster members corresponding to the engaged portions are optionally provided.

Though the cylindrical case 2, the joint 3, and the cap member 5 in the exemplary embodiments are metallic components, such an arrangement is not limiting. For instance, at least one of the cylindrical case 2, the joint 3, or the cap member 5 is made of a synthetic resin in some embodiments of the invention.

In the above exemplary embodiment, the physical quantity measuring devices 1, 1A are configured to measure the pressure of the measurement target fluid. However, for instance, a differential pressure or a temperature is measured in some embodiments.

What is claimed is:

1. A physical quantity measuring device comprising:
    a cylindrical case comprising a circumferential portion with a through hole formed therein;
    a sensor module housed in the cylindrical case and configured to detect a physical quantity;
    a joint attached with the sensor module, the joint being disposed to cover a first opening of the cylindrical case;
    a cap member disposed to cover a second opening of the cylindrical case;
    a circuit board comprising an electronic circuit configured to receive a signal detected by the sensor module and an electronic adjuster configured to adjust the electronic circuit, the circuit board being housed in the cylindrical case;
    a sealing member attached to the through hole;
    an adjuster member configured to adjust the electronic adjuster, and
    a cover member attached to the electronic adjuster to cover the electronic adjuster, wherein
    the electronic adjuster comprises an engaged portion disposed to face the through hole,
    the sealing member is provided with a housing recess opened to an outside of the cylindrical case and a communication hole that brings the housing recess into communication with an interior of the cylindrical case,
    the adjuster member comprises a shaft hermetically attached in the communication hole, an engagement portion provided at a first end of the shaft and configured to engage with the engaged portion, and an operable portion provided at a second end of the shaft and housed in the housing recess, and
    the cover member comprises a cover body covering the electronic adjuster, and a guide configured to guide the engagement portion to a position corresponding to the engaged portion.

2. The physical quantity measuring device according to claim 1, wherein:
    a first groove is formed on the shaft along an outer circumference of the shaft, and
    the guide is provided with a first projection engageable with the first groove.

3. The physical quantity measuring device according to claim 2, wherein
    the shaft is provided with a projection projecting along the outer circumference and engagable with the first projection, and
    the cover member is an elastic component that is configured to bias the projection of the adjuster member with the first projection in a direction for separating the engagement portion from the engaged portion in an axial direction of the shaft.

4. The physical quantity measuring device according to claim 1, wherein
    a second groove is formed on the shaft along the outer circumference of the shaft, and
    the sealing member comprises a second projection projecting into the communication hole to be engaged with the second groove.

5. The physical quantity measuring device according to claim 4, wherein
    the sealing member is an elastic component that biases the adjuster member with the second projection in a direction for separating the engagement portion from the engaged portion in an axial direction of the shaft.

* * * * *